US009575495B2

(12) United States Patent
Hefley

(10) Patent No.: US 9,575,495 B2
(45) Date of Patent: *Feb. 21, 2017

(54) WATER HEATING APPARATUS FOR CONTINUOUS HEATED WATER FLOW AND METHOD FOR USE IN HYDRAULIC FRACTURING

(71) Applicant: HEAT ON-THE-FLY, LLC, Covington, LA (US)

(72) Inventor: Ransom Mark Hefley, Elk City, OK (US)

(73) Assignee: HEAT ON-THE-FLY, LLC, Houston, TX (US)

( * ) Notice: Subject to any disclaimer, the term of this patent is extended or adjusted under 35 U.S.C. 154(b) by 464 days.

This patent is subject to a terminal disclaimer.

(21) Appl. No.: 14/259,524

(22) Filed: Apr. 23, 2014

(65) Prior Publication Data
US 2014/0311744 A1   Oct. 23, 2014

Related U.S. Application Data

(63) Continuation of application No. 13/443,678, filed on Apr. 10, 2012, now Pat. No. 8,739,875, which is a
(Continued)

(51) Int. Cl.
*G05D 23/13* (2006.01)
*E21B 43/26* (2006.01)
(Continued)

(52) U.S. Cl.
CPC ......... *G05D 23/1306* (2013.01); *E21B 43/26* (2013.01); *E21B 43/267* (2013.01); *F24H 1/125* (2013.01)

(58) Field of Classification Search
CPC ........ B01F 5/0471; B01F 5/0475; B01F 5/10; B01F 5/106; E21B 36/00; E21B 36/006;
(Continued)

(56) References Cited

U.S. PATENT DOCUMENTS 1,522,120 A   1/1925 Halder
1,527,740 A   2/1925 Lipshitz
(Continued)

FOREIGN PATENT DOCUMENTS

WO   WO 2010-018356   2/2010

OTHER PUBLICATIONS

Reexamination File History for Control No. 90/013,260, 2673 Pages.
(Continued)

*Primary Examiner* — Elizabeth Gitlin
(74) *Attorney, Agent, or Firm* — Garvey, Smith, Nehrbass & North, L.L.C.; Seth M. Nehrbass; Charles C. Garvey, Jr.

(57) ABSTRACT

A method of hydraulic fracturing of an oil producing formation includes the provision of a heating apparatus which is transportable and that has a vessel for containing water. The method contemplates heating the water up to a temperature of about 200° F. (93.3° C.). A water stream of cool or cold water is transmitted from a source to a mixer, the cool water stream being at ambient temperature. The mixer has an inlet that receives cool or cold water from the source and an outlet that enables a discharge of a mix of cool or cold water and the hot water. After mixing in the mixer, the water assumes a temperature that is suitable for mixing with chemicals that are used in the fracturing process, such as a temperature of about 40°-120° F.+ (4.4-48.9° C.+). An outlet discharges a mix of the cool and hot water to surge tanks or to mixing tanks. In the mixing tanks, a proppant and an optional selected chemical or chemicals are added to the water which has been warmed. From the mixing tanks, the water with proppant and optional chemicals is injected into the well for part of the hydraulic fracturing operation. The mixer preferably employs lateral fittings that enable heated
(Continued)

water to enter the mixer bore at an acute angle. The mixer can also provide a lateral fitting that exits the mixer bore upstream of the first lateral fitting, the second lateral fitting transmitting water via a conduit such as a hose to the heater.

48 Claims, 11 Drawing Sheets

Related U.S. Application Data continuation of application No. 12/842,738, filed on Jul. 23, 2010, now Pat. No. 8,171,993.

(60) Provisional application No. 61/297,097, filed on Jan. 21, 2010, provisional application No. 61/254,122, filed on Oct. 22, 2009, provisional application No. 61/276,950, filed on Sep. 18, 2009.

(51) Int. Cl.
  *E21B 43/267* (2006.01)
  *F24H 1/12* (2006.01)

(58) Field of Classification Search
  CPC .......... E21B 43/16; E21B 43/25; E21B 43/26; F23M 5/08; F27D 1/12; F27D 1/021; F24H 1/125; G05D 23/1306; C21B 7/10; F22B 37/102; F22D 5/00; F22D 11/06; F22D 1/24; F22D 3/00; F01K 9/023; F04B 16/24
  See application file for complete search history.

(56) References Cited

U.S. PATENT DOCUMENTS

| | | |
|---|---|---|
| 2,065,789 A | 12/1936 | Bolsinger |
| 2,122,900 A | 7/1938 | Reif |
| 2,395,258 A | 2/1946 | Calvin |
| 2,486,141 A | 10/1949 | Follo |
| 2,631,017 A | 3/1953 | Clyde |
| 2,645,463 A | 7/1953 | Stearns |
| 2,969,451 A | 1/1961 | Logan |
| 3,232,336 A | 2/1966 | Leslie et al. |
| 3,379,250 A | 4/1968 | Matthews et al. |
| 3,411,571 A | 11/1968 | Lawrence |
| 3,421,583 A | 1/1969 | Koons |
| 3,454,095 A | 7/1969 | Webster et al. |
| 3,572,437 A | 3/1971 | Marberry et al. |
| 3,581,822 A | 6/1971 | Cornelius |
| 3,685,542 A | 8/1972 | Daughirda |
| 3,698,430 A | 10/1972 | Van Gasselt et al. |
| 3,816,151 A | 6/1974 | Podlas |
| 3,938,594 A | 2/1976 | Rhudy |
| 3,980,136 A | 9/1976 | Plummer et al. |
| 4,076,628 A | 2/1978 | Clampitt |
| 4,137,182 A | 1/1979 | Golinkin |
| 4,518,568 A | 5/1985 | Shannon |
| 4,807,701 A | 2/1989 | Hall et al. |
| 5,018,396 A | 5/1991 | Penny |
| 5,038,853 A | 8/1991 | Callaway |
| 5,183,029 A | 2/1993 | Ranger |
| 5,190,374 A | 3/1993 | Harms et al. |
| 5,445,181 A | 8/1995 | Kuhn et al. |
| 5,467,799 A | 11/1995 | Buccicone et al. |
| 5,494,077 A | 2/1996 | Enoki et al. |
| 5,551,630 A | 9/1996 | Enoki et al. |
| 5,586,720 A | 12/1996 | Spiegel |
| 5,588,088 A | 12/1996 | Flaman |
| 5,623,990 A | 4/1997 | Pirkle |
| 5,656,136 A | 8/1997 | Gayaut et al. |
| 5,979,549 A | 11/1999 | Meeks |
| 6,024,290 A | 2/2000 | Dosani et al. |
| 6,470,836 B1 | 10/2002 | Manley et al. |
| 7,298,968 B1 | 11/2007 | Boros et al. |
| 7,477,836 B2 | 1/2009 | White, III |
| 7,744,007 B2 | 6/2010 | Beagen et al. |
| 8,044,000 B2 | 10/2011 | Sullivan et al. |
| 8,171,993 B2 | 5/2012 | Hefley |
| 8,286,595 B2 | 10/2012 | Cerney et al. |
| 8,534,235 B2 | 9/2013 | Chandler |
| 8,739,875 B2 | 6/2014 | Hefley |
| 2007/0114035 A1 | 5/2007 | Parris et al. |
| 2007/0170273 A1 | 7/2007 | McIllwain |
| 2008/0029267 A1 | 2/2008 | Shampine |
| 2009/0056645 A1 | 3/2009 | Hobbs et al. |
| 2009/0060659 A1 | 3/2009 | Wallace |
| 2009/0308613 A1 | 12/2009 | Smith |
| 2010/0000508 A1 | 1/2010 | Chandler |

OTHER PUBLICATIONS

Habib D. Zughbi et al., Mixing in Pipelines with Side and Opposed Tees, Ind. Eng. Chern. Res., American Chemical Society, 42 (21), pp. 5333-5344 (2003).
Keng Seng Chan et al., Oilfield Chemistry at Thermal Extremes, Oilfield Review, pp. 4-17 (Autumn 2006).
Web page describing Firestorm™ Direct-Contact Water Heaters, captured on May 11, 2008 by the Internet Archive, copy available at brochure http://web.archive.org/web/20080511165612/http://www.heatec.com/products concrete/firestorm/firestorm.htm.
Komax HotShot™ Inline Steam Heater, available at least as early as Apr. 20, 2008, https://web.archive.org/web/20080420074231/http://www.komax.com/products/inline_steam_heater.html.
Armstrong International, Flo-Rite-Temp Bulletin No. AY-408-H, May 2002, available at https://web.archive.org/web/20071213171904/http://www.armstronginternational.com/files/products/wheaters/pdf/ay408.pdf.
Consulting Agency Trade (C.A.T.) GmbH, Hydration Unit, Feb. 29, 2008, available at http://www.consulting-agency-trade.com/files/hydration_unit_04.pdf.
PSNC Energy, "Commercial and Industrial Facilities Go 'Tankless,'" available on the Internet at least as early as Nov. 18, 2006, Internet Archive Wayback Machine, http://web.archive.org/web/20061118194825/http://www.psncenergy.com/en/small-to-medium-business/business-sectors/hospitality/commercial-industrialfacilities.
Deposition of Francis Bostick, dated Aug. 7, 2014.
Deposition of Ron Chandler, dated Jun. 17, 2014.
Deposition of James Cole, dated Jul. 17, 2013.
Deposition of Michael Gibson, dated Jan. 8, 2015.
Deposition of Jonathon Holub, dated Jun. 17, 2014.
30(b)(6) Deposition of Energy Heating, LLC, Wayne Lind, dated Aug. 15, 2013.
Deposition of Ron Lyles, dated Jul. 17, 2013.
30(b)(6) Deposition of Rocky Mountain Oil Field Services, LLC, Matthew Mason deponent, dated Aug. 14, 2013.
Deposition of Matthew Mason, dated Oct. 21, 2014.
30(b)(6) Deposition of Heat Waves Oil Serivce, LLC, Austin Peitz deponent, dated Oct. 23, 2014.
Deposition of Brian Radke, dated Sep. 30, 2014.
Deposition of Michael Siepert, dated Oct. 21, 2014.
30(b)(6) Deposition of StimTech, Roger Torgerson deponent, dated Apr. 23, 2014.
Deposition of Jim Wharry, dated Jan. 8, 2015.
Reexamination File History for Control No. 90/012,627, 307 Pages.
"Optimizing the Performance of Radiant Heating System" dated Jul. 1, 2008.
Findings of Fact, Conclusions of Law, and Order for Judgment on Issue of Inequitable Conduct, Civil Case No. 4:13-cv-10, *Energy Heating, LLC, et al.* v. *Heat On-The-Fly, LLC, et al.*, United States District Court for the District of North Dakota, Record Document No. 619, Dated Jan. 14, 2016.
Declaration of Len Brignac (Offer of Proof), Civil Case No. 4:13-cv-10, *Energy Heating, LLC, et al.* v. *Heat On-The-Fly, LLC, et al.*, United States District Court for the District of North Dakota, Record Document No. 580, Dated Sep. 18, 2015.

(56) References Cited

OTHER PUBLICATIONS

Declaration of Seth Nehrbass (Offer of Proof), Civil Case No. 4:13-cv-10, *Energy Heating, LLC, et al.* v. *Heat On-The-Fly, LLC, et al.*, United States District Court for the District of North Dakota, Record Document No. 579, Dated Sep. 18, 2015.
International Search Report for International application No. PCT/US2010/045791.
Written Opinion of the International Searching Authority for International application No. PCT/US2010/045791.
Sep. 2, 2015 Office Action for pending U.S. Appl. No. 14/502,652, 10 Pages.
Plaintiffs' Non-Infringement and Invalidity Contentions, US District Court for the District of North Dakota by Energy Heating, LLC, and Rocky Mountain Oilfield Services, LLC against Heat on-the-Fly, LLC and Super Heaters North Dakota, LLC (No. 4:13-cv-00010-DLH-CSM).
Redline Version of Plaintiffs' Amended Non-Infringement and Invalidity Contentions, US District Court for the District of North Dakota by Energy Heating, LLC, and Rocky Mountain Oilfield Services, LLC against Heat on-the-Fly, LLC and Super Heaters North Dakota, LLC (No. 4:13-cv-00010-DLH-CSM).
Ralph R. Erickson, Chief Judge, Memorandum Opinion and Order Granting Plaintiffs/Third-Party Defendant's Motions for Partial Summary Judgment of Invalidity and Denying Defendants' Motion to Dismiss Inequitable Conduct Claims from 4:13-cv-00010-RRE-ARS, *Energy Heating, LLC, et al.* v. *Heat On-The-Fly, LLC, et al.*, pp. 1-22, published on Mar. 31, 2015 by United States District Court for the District of North Dakota, Northwestern Division.†

† cited by third party

FIG. I.

WATER HEATING APPARATUS FOR CONTINUOUS HEATED WATER FLOW AND METHOD FOR USE IN HYDRAULIC FRACTURING

CROSS-REFERENCE TO RELATED APPLICATIONS

This is a continuation of U.S. patent application Ser. No. 13/443,678, filed 10 Apr. 2012, which is a continuation of U.S. patent application Ser. No. 12/842,738, filed 23 Jul. 2010.

Incorporated herein by reference are my prior U.S. patent application Ser. No. 13/443,678, filed 10 Apr. 2012, my prior U.S. patent application Ser. No. 12/842,738, filed 23 Jul. 2010, my prior U.S. provisional patent application No. 61/297,097, filed 21 Jan. 2010, my prior U.S. provisional patent application No. 61/254,122, filed 22 Oct. 2009, and my prior U.S. provisional patent application No. 61/276,950, filed 18 Sep. 2009. Priority of these applications is hereby claimed.

Also incorporated herein by reference is International Application Serial No. PCT/US2010/045791, filed 17 Aug. 2010 (published 24 Mar. 2011 as International Patent Publication No. WO 2011/034679 A2).

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a method and apparatus for the continuous preparation of heated water flow for use in hydraulic fracturing.

2. General Background of the Invention

In connection with production of oil or gas from a geological formation, the production may have a poor flow rate due to low permeability or from damage or clogging of the formation during drilling particularly in formations of tight sands with low porosity and oil & gas shales. Hydraulic fracturing also known as "fracing" is a process employed after the well has been drilled, for the completion of the well to enhance hydrocarbon production.

Hydraulic fracturing creates porosity by fracturing the formations surrounding the wellbore. These fractures allow the oil or gas to flow more easily from the tight sands or shales to the production well. The common method to create fractures in the formation is to pump a mixture of water, chemicals and sands into the rock or formation. When the pumped fluid mixture reaches sufficient pressures, the formation will fracture, creating the permeability required to release the captured hydrocarbons.

Hydraulic fracturing generally entails injecting fluid into the wellbore at a sufficient rate and pressure to overcome the tensile strength of the formation creating cracks or fractures extending from the wellbore. U.S. Pat. No. 3,816,151, U.S. Pat. No. 3,938,594 and U.S. Pat. No. 4,137,182 (each hereby incorporated herein by reference) relate to hydraulic fracturing processes using various fracturing fluids.

Also incorporated herein by reference are the following US Patent document no: 2008/0029267; U.S. Pat. Nos. 5,979,549; 5,586,720; 5,183,029; 5,038,853; 4,518,568; 4,076,628; 2,631,017; 2,486,141; 2,395,258; 2,122,900; 2,065,789.

One of the key elements of the fracturing fluid is water, which is the carrying fluid for the proppant (and optional appropriate chemical mix) required for the process. The proppant holds open the fractures and provides porosity to allow hydrocarbons to flow out of the formation. Before the fracing fluid is injected into the well, the water is normally heated to the target temperature (e.g., 40° F. to 120° F.+ (4.4° C. to 48.9° C.+)), which depends on the geologic formation and chemicals used, for example, typically 65° F.-75° F. (18° C.-24° C.) in the Bakken Shale located in North Dakota, Montana, and southern Canada) in order to achieve the proper chemical mix required for each particular hydraulic fracturing operation. A further result of heating the water prior to mixing with chemicals is the reduction of amount of chemicals that may be required for the hydraulic fracturing operation. In addition, a lower density of the heated water reduces the pressure on the pipes and connections and thereby reduces the risk for mechanical failure. In colder months and in colder environments, the temperature of the available water sources are typically less than 50° F. (10° C.) (even as low as below freezing) which is generally an unsuitably cold temperature for the fracing process. It is necessary to heat the available water to a temperature (e.g., 40° F. to 120° F.+ (4.4° C. to 48.9° C.+)) suitable for the fracing process prior to the water and fracing fluids being pumped down hole.

There are common and known methods of providing heated water, which require that prior to the fracing process, the source water is pumped into numerous frac tanks and then the water in each individual frac tank is circulated through a heating unit to raise the temperature in the frac tank to a preset temperature required for the chemical mixing of the frac. However, due to the time lapse between heating (which is typically done the night before the fracing operations) significant thermal loss occurs. Each tank has to be heated to temperatures of for example 10-50° F. (5.6° C. to 27.8° C.) (often 20° F. to 30° F. (–11.1° C. to 16.7° C.)) higher than is operationally necessary. For example, if the required temp is 70° F. (21° C.), then each tank would need to be heated to at least 90°-120° F. (32° C.-48.9° C.). The extensive over-heating is a substantial expense and energy waste. The pumping of water to the frac tanks and the use of heating units to heat the water in the frac tank are well known in the industry. FIG. 5 is an example of a prior art type configuration. There are multiple commercial businesses which provide such services. The number of frac tanks can typically range from 20-700 tanks (the average at the Marcellus Shale (located in western New York extending south to Tennessee) is 500 tanks)—currently it costs around $500-2,000 per frac tank in a typical fracing process (delivery, rental, cleaning, and demobilization of the tank), so these frac tanks are a substantial expense in the fracing process. Typically a substantial amount of safety issues in fracing operations involves the handling of frac tanks. One must heat the frac tanks to enough above the target temperature to allow for thermal loss between heating and use. Because normally heating of frac tanks occurs at night, this can be 10-50 degrees F. (5.6° C. to 27.8° C.), for example. The amount of temperature above target will depend on local weather conditions.

BRIEF SUMMARY OF THE INVENTION

The apparatus and method of the invention requires a water source, pumps and piping that can provide continuous delivery of water, such as up to about 100 barrels (11.9 kl) (sometimes as high as 150 (17.9 kl), and sometimes as low as 30-50 barrels (3.6-6.0 kl)) a minute through a mixer or mixing manifold and to frac tanks.

As the water (usually cool or cold water) is pumped from its source through the mixing manifold, a portion of the water volume (for example 7 barrels (0.83 kl) a minute) is diverted through piping at the manifold to and through a heating unit. This heating device is preferably a mobile unit that can heat a smaller volume of water, such as up to about 7 barrels (0.83 kl) per minute with a for example 22 million BTU (23.2 billion Joules) heater (which consistently heats to that capacity in all weather conditions, regardless of ambient temperatures).

The heating unit creates an increase in the ambient water temperature of the e.g., 7 bbls (0.83 kl) of the diverted water to usually around 190-200° F. (87.8-93.3° C.) (and up to 240° F. (116° C.) in a pressurized piping system). This heating is preferably done on a continuous flow basis (as opposed to a batch process) with the heated water delivered through piping back into the mixing manifold and continuously mixed into the ambient water flow. The mixing of the superheated water with the cooler water results in an increase in water temperature of approximately 5°-15° F. (2.8-8.3° C.) at a rate of e.g. 100 barrels (bbls) (11.9 kl) per minute of continuous pumping flow (per each heater unit). Lower flow rates (such as 20 bbls (2.4 kl) per minute) will increase the temperature faster to result in a higher temperature rise. One can even run at 150 bbls (17.9 kl) per minute, but the temperature rise per unit will be lower.

To achieve higher water temperatures, multiple heating units (for example 2-4 or even more) can be used to heat the water, all of which is preferably done on a continuous flow basis. The moving stream of uniformly heated water is preferably piped to a small number of optional frac tank(s) which can be used as a safety buffer between the water flow and the pumping operations, in the case of a mechanical breakdown or operational problems.

The heating system with manifold can be designed for continuous heating preferably up to about 100 bbls (11.9 kl) per minute (or even more). To meet the required (target) temperature for the water used in the fracing process (e.g., 40° F. to 120° F.+ (4.4° C. to 48.9° C.+), and often about 65°-75° F. (18° C.-24° C.), or 70°-80° F. (21° C.-27° C.)), the rate of flow from the ambient source water can be adjusted to provide greater or lesser volume and multiple, sequential mixing manifolds and heater units can be added to the process.

The mixing manifold includes an intake opening and an outflow opening allowing the source flowing water to pass through the mixing manifold to the frac tanks. Between the intake opening and the outflow opening, the mixing manifold has at least one cold water diversion opening connected to piping to deliver a portion of cold water flow to the heating unit. In the mixing manifold, a hot water return opening is located downstream of the cold water diversion opening, and this second opening, referred to as the hot water return opening, allows the heated water into the mixing manifold mixing with the cold water stream uniformly raising the temperature of the water before the water reaches the frac tanks (or the mixing tank or tanks if frac tanks are omitted).

In another embodiment, before pumping the heated water to a frac tank (or the mixing tank or tanks if frac tanks are omitted), the flow of the mixed heated water can again be passed through a second mixer or second mixing manifold and a portion of the mixed heated water is diverted to a second heating unit to heat that water to 200° F. to 240° F. (93.3° C. to 116° C.), and that superheated water can be returned to the mixing manifold for mixing with the continuously moving water stream at about 100 bbls. (11.9 kl) per minute providing an additional +10° F. to +15° F. (+5.6° C. to +8.4° C.) uniform elevation of the temperature of the water flow. This mixed and heated water can then be piped to optional frac tanks (if used) and then to a mixing tank(s) for mixing with fracing chemicals and then pumped down hole for use in the hydraulic fracing process. If needed, multiple sequential heating units can be attached along the pumping line to continuously raise the temperature of the continuous flow of water to the required or predetermined target temperature.

The mixing manifold can be any length or size of pipe or tank used in the industry and the cold water diversion opening and the hot water return opening can be configured and spaced in the mixing manifold, or along the piping, in any useful manner to allow superheated water to mix with continuously flowing source water.

The mixing manifold or mixer can be for example 6-12 inches (15-30 cm) in diameter, such as a 10 inch (25 cm) diameter tubular member or pipe with a length of approximately 2 to 3 feet (61-91 cm). The pipe diameter and length can vary according to the requirements of the pumping operations. The cold water diversion opening is connected to a smaller pipe (such as a 3 inch (7.6 cm) pipe) that is preferably attached to the mixing manifold at an angle (such as approximately 45°) forming a "y" with the mixing manifold and the cold water diversion pipe. When heating water in Oklahoma, some operators use 10-inch (25 cm) lines, some use 12-inch (30 cm) lines. When heating water in Pennsylvania, some operators use 10-inch (25 cm) lines, and others use four to six 6-inch (10-15 cm) lines.

Preferably, a raised rigid semi-circle shaped lip extends from the backside of the cold water diversion opening into the mixing manifold creating a partial blockage or impediment of the source water flow stream causing a portion of the cold water flow stream to divert into the cold water diversion opening and through the piping to the heating unit. This protruding lip partially blocks and obstructs the water flow inducing suction and flow into the pipe to the heating unit. This partial blockage in the mixing manifold also creates turbulence in the source water flow at and beyond the cold water diversion opening that aids in mixing at the superheated water inflow point. The lip can be a rigid metal concave half circle having for example a ⅛ inch (0.32 cm) width and 1.5 inch to 2 inch (3.81 cm to 5.08 cm) height at its highest point with tapering to meet flush with the side of the mixing manifold at the ends of the semi-circle of the lip; however, the lip can be many shapes, sizes and locations in the mixing manifold to induce suction and create turbulence in the mixing manifold.

The hot water return opening in the manifold for attachment of piping for the superheated water is preferably located downstream of the cold water diversion opening in the flowing source water in the mixing manifold of the outflow pipe. The hot water return opening for delivery of superheated water preferably likewise has a lip extending into the stream of flowing water creating further turbulence in the water resulting in greater mixing action of the superheated water with the continuously flowing cold water creating a rise in temperature of the cold water as it passes along the mixing manifold and through the piping to the frac tanks serving as surge tanks (or directly to mixing tanks if there are no frac tanks acting as surge tanks). This second lip located on the front side or upstream side of the opening provides a partial blocking of the flow of cold water aiding in the flow of the superheated water into the mixing manifold. This lip adjacent to the opening on the hot water return opening is optimally of the same size and shape of the cold water diversion lip; however, this lip can also be utilized in many shapes, sizes and locations in the mixing manifold to partially block flow to facilitate hot water flow into the mixing manifold and create additional turbulence in the mixing manifold.

Additional mixing of the hot and cold water occurs beyond the mixing manifold as the water flow is piped into and fills the optional frac tanks if used and then piped as operations dictate to mixing tanks to frac pumping units and to downhole. The heated water is delivered and can be temporarily held in frac tanks or surge tanks or pumped directly to mixing tanks without surge tanks. The apparatus and process substantially reduce the number of required frac tanks (or even eliminate the need for frac tanks). In one embodiment of the described process, approximately six to eight 500 bbl (59.6 kl) frac tanks are utilized, which are used as a safety buffer between the water flow and the pumping operations, in the case of a mechanical breakdown or operational problems.

Suitable heating units can be commercially purchased through manufacturers or fabricated. Exemplary manufacturers include Rush Sales Company located in Odessa, Tex. (they produce Rush Frac Water Heaters), and Chandler Manufacturing, Inc. in Wichita Falls, Tex. (the diesel unit with six burners and a 22 million BTU (23.2 billion Joules) capacity is preferred) and Vita International. Conventional heating trucks shown in FIG. 5 typically produce much less than 20 million BTU (21.1 billion Joules). They could be used in the system and method of the present invention, but more robust heating units 12 (such as those produced by Chandler Manufacturing, Inc.) capable of delivery of at least 15 million BTU (15.8 billion Joules), preferably up to 25 million BTU (26.4 billion Joules) (e.g. 22 million BTU (23.2 billion Joules) or more) are preferred. The piping, pumps and frac tanks are all readily available from numerous suppliers and contractors in the industry.

There are numerous other conceivable arrangements and configurations of the inflow and outflow of the cold water and hot water and piping in the mixing manifold, including parallel pumping of cold and hot water inflow and use of secondary source of water to the heaters independent of the primary source water passing through the mixing manifold.

The method of this invention can include some or all of the following steps. These steps can be in the following order.

1) Establish a flow of source water at between about 20-150+ bbls (2.4-17.9+ kl) (more typically 60 to 100 bbls (7.2 to 11.9 kl)) per minute through piping to a piping manifold or mixer, which diverts a portion of the source water to one or more heating units, 2) The superheated water returns to the continuous flowing source water to meet the required or target temperatures, and 3) The warmed water (e.g. 60°-120° F.+ (16-48.9° C.+), typically 65°-80° F. (18-27° C.)) sent to the mixing tanks for chemical additives and the eventual fracing process.

Examples of chemicals that can be added to the water include: bentonite gel and other chemicals used by such frac operators as Schlumberger, Halliburton, and BJ Services. Typically proppants (such as sand, ceramic beads, bauxite, or others) are mixed with the water before the water is injected downhole. The proppants help to keep the fractures which are produced open. The proppants can be for example any which are used by such frac operators as Schlumberger, Halliburton, and BJ Services.

In general, it is possible to use water of a lower temperature if one uses more chemicals. For example, while normally one might wish to use water of 40°-120° F. (4.4° C.-48.9° C.) in a particular fracing process at a particular location ("slick water frac" refers to a process where less chemicals are used (or sometimes even no chemicals)—it uses turbulent flow with a lot of pressure—proppants are used with all fracing processes—typically one can carry more (sometimes up to two to three times as much) proppant in a slick water frac compared to a gel frac), one could instead use water at a lower temperature of 60°-120° F. (16° C.-48.9° C.) ("gel frac" refers to this process where more chemicals are used—gel and proppant). Examples of amounts of water used in a fracing process are 30,000 barrels to 350,000 barrels (3,577-41,734 kl), though one might use as few as 10,000 barrels (1,192 kl) to over one million barrels (119,240 kl) (this larger amount may cover multiple wells, for example). Higher water temperature can sometimes result in lower chemical usage. Some of the wells currently are approaching 1 million pounds (453,592 kg) of sand as a proppant with 350,000 barrels (41,734 kl) of water.

Through testing in cold temperatures, the inventor has learned that heating water from around freezing to about 40 degrees F. (4.4° C.) takes a great degree of heat. One might need more heaters when heating water from near freezing, or one might initially preheat some water in frac tanks (e.g., 3 or 4 up to 50 or 100 frac tanks) to add heat one needs to move the temperature of the water up from near freezing to about 40 degrees F. (4.4° C.). One could also add heating in a water pit itself to help raise the water temperature to around 40 degrees F. (4.4° C.). Also, when a water source contains ice, it is best to withdraw only liquid water, and no ice, from the water source. Otherwise, a good amount of heat can be lost melting the ice.

Preferably one places one or two units near the water source and another unit near the fracing pumps. It appears that there is additional heating in the pipeline (due to friction, the inventor believes) of perhaps a degree or two F. (0.6-1.1° C.) when the water travels about a mile (1.61 km).

BRIEF DESCRIPTION OF THE SEVERAL
VIEWS OF THE DRAWINGS

For a further understanding of the nature, objects, and advantages of the present invention, reference should be had to the following detailed description, read in conjunction with the following drawings, wherein like reference numerals denote like elements and wherein:

The invention and features of the invention is shown and disclosed by the following Figures and photographs representing informal drawings.

DETAILED DESCRIPTION OF THE INVENTION

Figure 1:
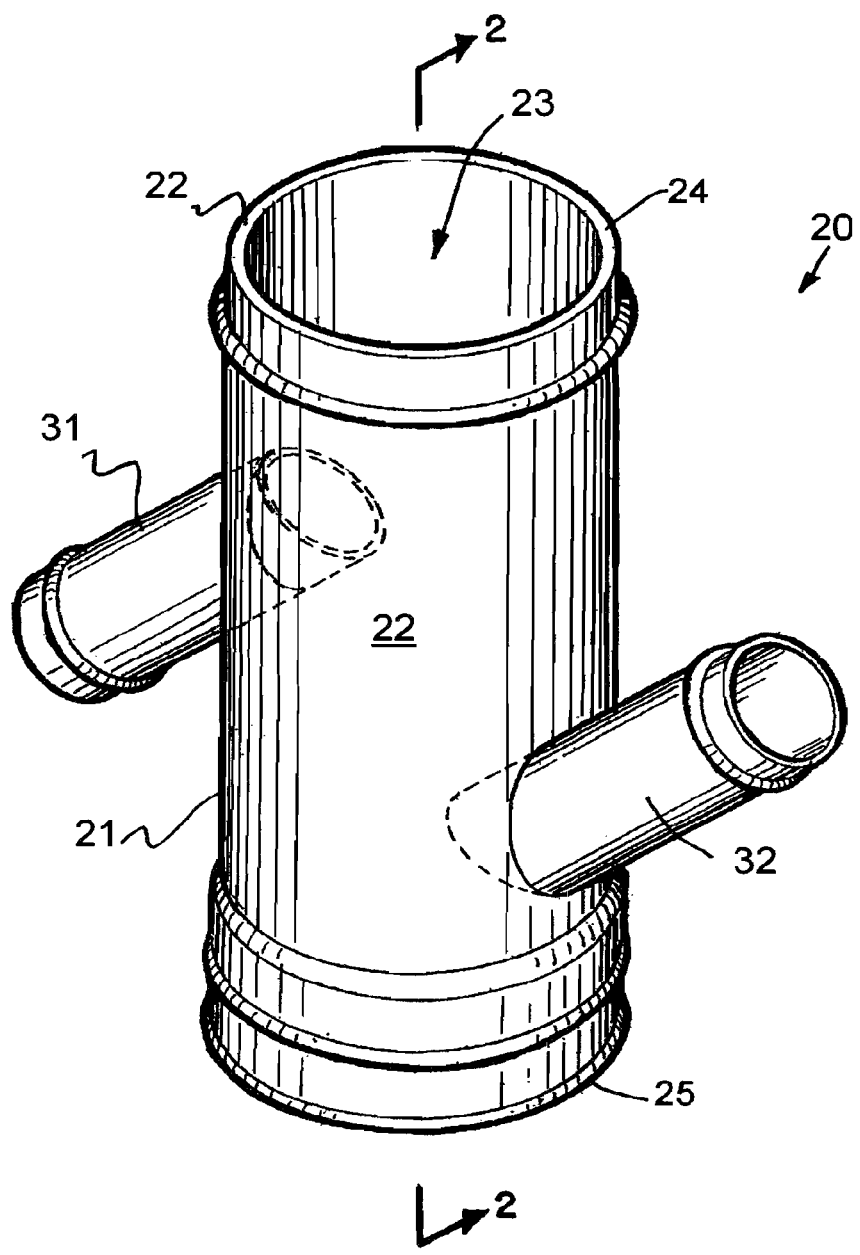
FIG. 1 is a partial perspective view of a preferred embodiment of the apparatus of the present invention.
Figure 2:
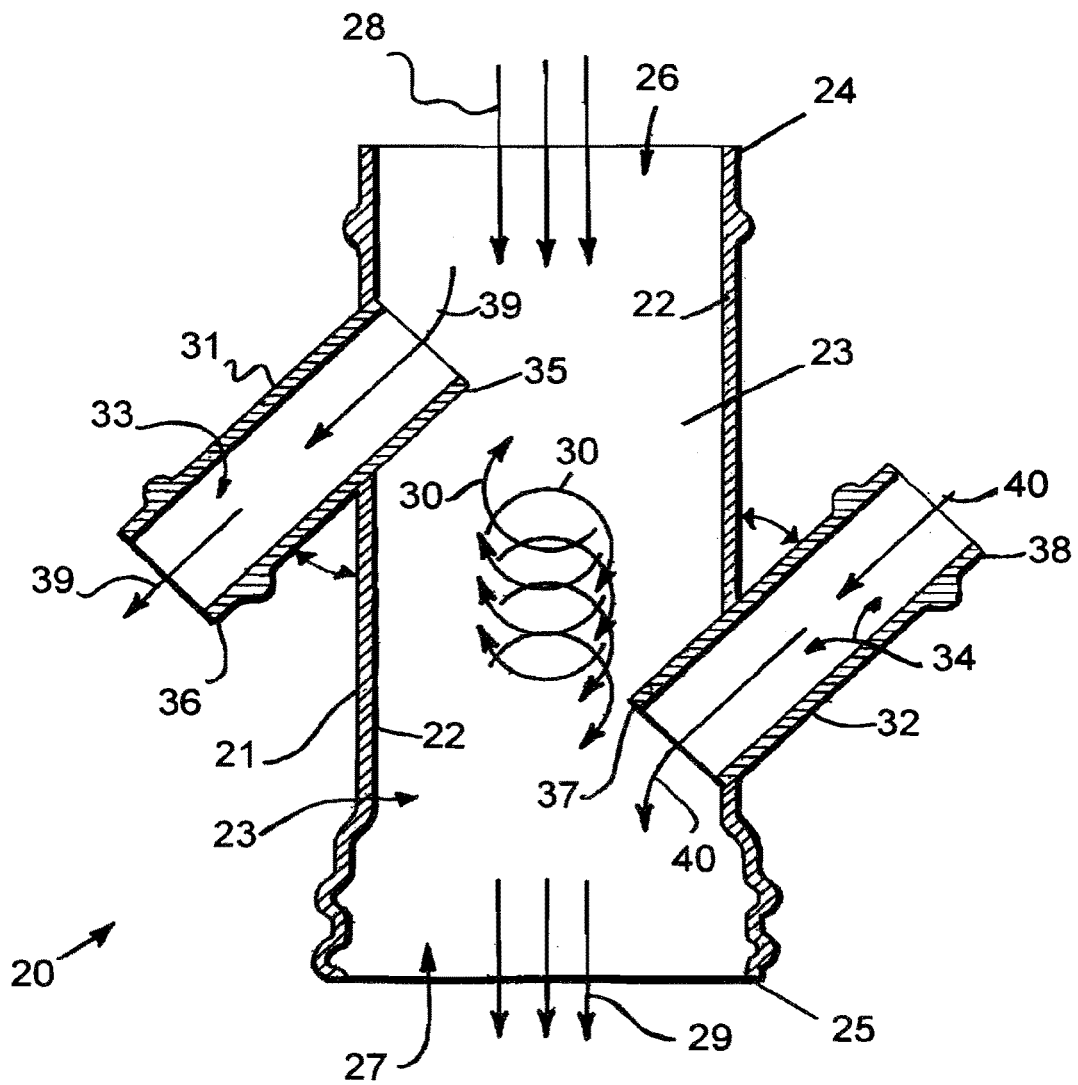
FIG. 2 is a sectional view taken along lines 2-2 of FIG. 1.
Figure 3:
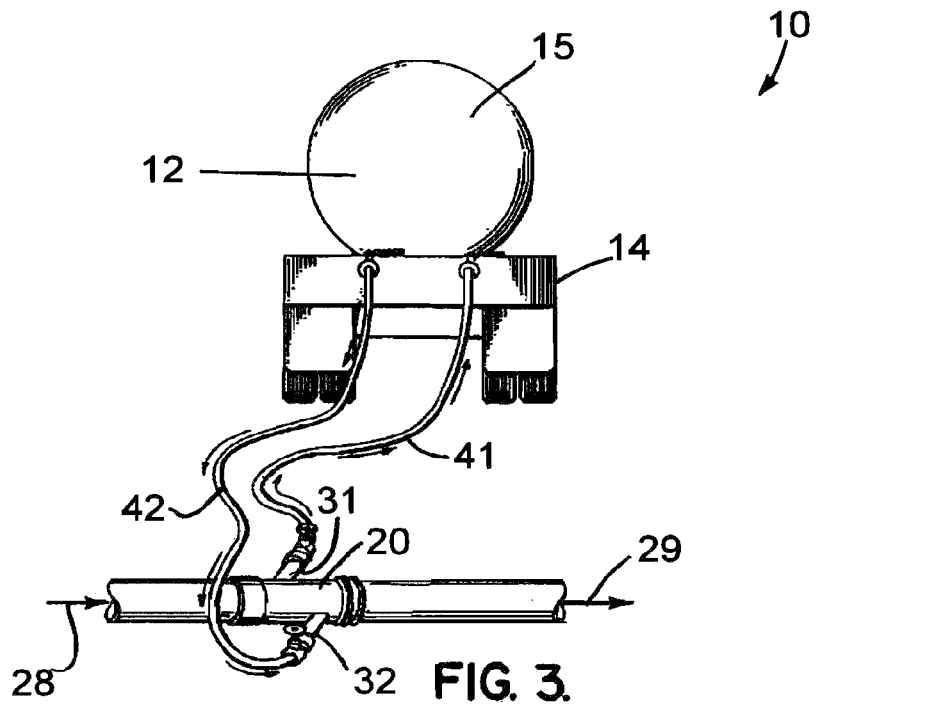
FIG. 3 is a schematic diagram of a preferred embodiment of the apparatus of the present invention and illustrating the method of the present invention.
Figure 6:
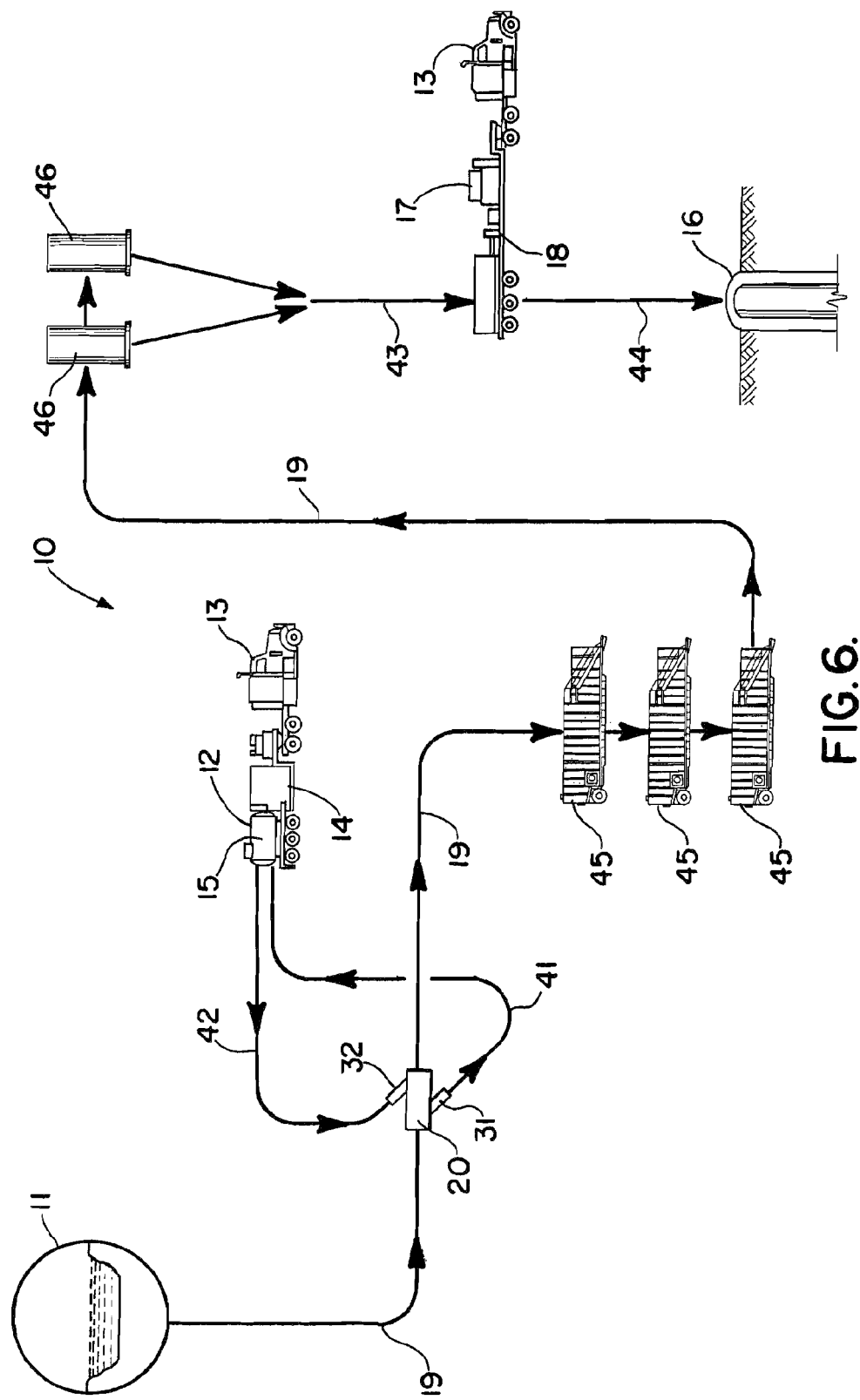
FIG. 6 is a schematic diagram of a preferred embodiment of the apparatus of the present invention.

FIGS. 1-4 and 6-12 show preferred embodiments of the apparatus of the present invention, designated generally by the numeral 10 in FIGS. 3 and 6. Alternate embodiments are designated by the numeral 110 in FIG. 4, by the numeral 210 in FIG. 7, by the numeral 310 in FIG. 8, by the numeral 410 in FIG. 9, by the numeral 510 in FIG. 10, by the numeral 610 in FIG. 11, and by the numeral 710 in FIG. 12. In FIG. 6, a water source 11 can be a reservoir, lake or other source of water.

Mobile heater apparatus 12 is used to super heat water for use in frac operations in an oil well. In general, such frac operations can be seen in U.S. Pat. No. 4,137,182, hereby incorporated herein by reference.

Mobile heater 12 is a transportable heating apparatus and includes a truck 13 and a trailer 14. Trailer 14 carries a heating vessel 15 which can be, for example, a tank or piping that holds water and that can be heated with electrical or other heating elements or with propane or preferably diesel burners. Water to be injected into an oil well 16 as part of a hydraulic fracturing operation include very hot water that is heated by mobile heater 12 and ambient water that is received from water source 11.

A pumping apparatus 17 which can include a truck 13 and trailer 18 pumps the prepared water (water plus selected chemical (optional) and proppant) into the well 16. Water from source 11 flows in flowline 19 to mixer 20. Mixer or mixing manifold 20 can be seen in more detail in FIGS. 1 and 2. Mixer 20 receives ambient temperature water from water source 11 and mixes that ambient temperature water with very hot water that is heated in vessel 15 of mobile heater 12.

The details of mixer 20 are seen in FIGS. 1 and 2. The mixer 20 has a tubular or cylindrically-shaped body 21 defined by a wall 22 which surrounds bore 23. Tubular body 21 has a first inlet 26 in a first inlet end portion 24, and a first outlet 27 in an outlet end portion 25. The bore 23 communicates with flow inlet 26 and flow outlet 27. Arrows 28, 29 illustrate the direction of flow of water in body 21 as shown in FIG. 2. Curved arrows 30 in FIG. 2 illustrate turbulent flow that occurs for ensuring that heated water and ambient temperature water thoroughly mix.

A pair of conduits are connected to tubular body 21. These include conduit 31 and conduit 32. Conduit 31 is a second outlet and removes ambient temperature water from the bore 23 of tubular body 21. Conduit 32 is a second inlet and injects heated water into bore 23 of tubular body 21 and downstream of conduit 31. In this fashion, conduit 31 does not discharge any heated water from bore 23 of tubular body 21. Rather, the water leaving bore 23 of tubular body 21 via conduit 31 is ambient temperature water. This discharge of ambient temperature from tubular body 21 of mixer 20 is illustrated by arrows 39 in FIG. 2.

Each of the conduits 31, 32 has a bore. The conduit 31 has bore 33. The conduit 32 has bore 34. Each of the conduits 31, 32 has an inner end portion and an outer end portion. Conduit 31 has inner end portion 35 and outer end portion 36. Conduit 32 has inner end portion 37 and outer end portion 38. Each of the inner end portions 35, 37 occupies a position within bore 23 of tubular body 21 as shown in FIG. 2. In this fashion, bore 33 of conduit 31 occupies a part of bore 23 of tubular body 21. Similarly, fluid discharging from bore 34 of conduit 32 is discharged directly into the bore 23 of tubular body 21. The arrows 40 in FIG. 2 illustrate the discharge of heated water via conduit 32 into bore 23 of tubular body 21.

While the angle of the longitudinal axis of bore 33 of conduit 31 and the angle of the longitudinal axis of bore 34 of conduit 32 in relation to the longitudinal axis of bore 23 of tubular body 21 are shown to be about 45 degrees, those angles could vary from 0 to 90 degrees, and they need not be the same.

As can be seen in FIG. 2, first inlet 26 is upstream of second outlet 31, which is upstream of second inlet 32, which itself is upstream of first outlet 27.

In FIG. 6, flow lines 41 and 42 are used to transfer water in between mobile heater 12 and mixer 20. The flow line 41 receives water from conduit 31, a second outlet, which is ambient temperature water and transports that ambient temperature water to vessel 15 of heater 12. After water has been heated in vessel 15, it is transported via flow line 42 to conduit 32, a second inlet, of mixer 20. It should be understood that the flow of fluids from flow line 41 to and through vessel 15 of heater 12 and then to flow line 42 can be a continuous process. As an example, the flow of ambient temperature water in flow line 19 can be about 20-150 bbls (2.4-17.9 kl) per minute, and typically around 60-100 barrels (7.2-11.9 kl) per minute. The flow rate in flow lines 41 and 42 can be for example a continuous 7 barrels (0.83 kl) per minute.

The temperature in the super heated flow line 42 can be in excess of 200° F. (93.3° C.) and in excess of 240° F. (116° C.) if flow line 42 is pressurized. Flow lines 43 and 44 illustrate the transfer of warmed water from mixing tanks or downhole tanks 46 to pumping apparatus 17 and then into the well 16 for use in frac operations. In FIG. 6, surge tanks 45 can optionally be used downstream of mixer 20 and upstream of mixing tanks 46.

Figure 4:
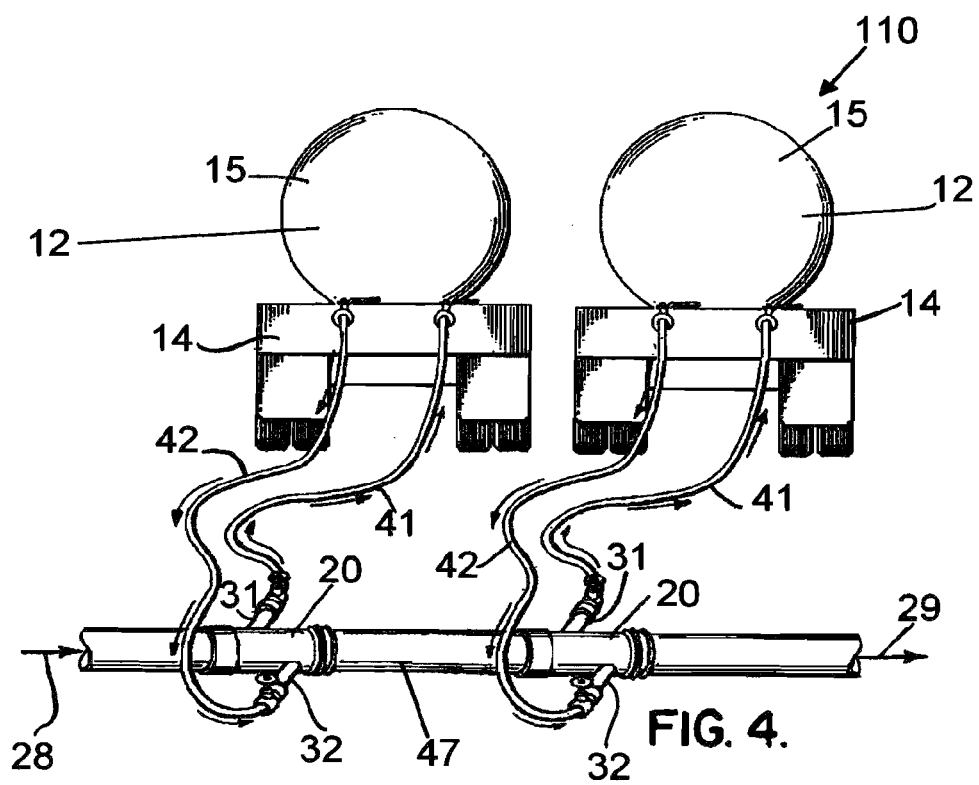
FIG. 4 is a schematic diagram of another preferred embodiment of the apparatus of the present invention and illustrating a method of the present invention.

To achieve higher water temperatures, multiple heating units 12 can be used to heat the water all of which is done on a continuous flow basis as shown in FIG. 4. The moving stream of uniformly heated water can be piped to surge tank(s) which can be used as a safety buffer between the water flow and the pumping operations, in the case of a mechanical breakdown or operational problems.

In FIG. 4, a joint of pipe 47 (commercially available) can be placed in between the two mixers 20 as shown. In FIG. 4, the flow of the mixed heated water can be passed through a second mixer or second mixing manifold 20 and a portion of the mixed heated water is diverted to a second heating unit 12 to heat that water to for example between about 200° F. to 240° F. (93.3° C. to 116° C.). That superheated water can be returned to the mixing manifold 20 for mixing with the continuously moving water stream providing an additional +10° F. to +15° F. (+5.6° C. to +8.4° C.) uniform elevation of the temperature of the water flow. This mixed and heated water can then be piped to mixing tanks 46 for mixing with any selected hydraulic fracturing chemicals and then pumped down hole for use in the hydraulic fracturing process. If needed, multiple sequential heating units 12 (and mixers 20) can be attached along the pumping line to continuously raise the temperature of the continuous flow of water to a required or target temperature. The mixers 20 can be connected in series (as in FIG. 4) or in parallel or a combination of series and parallel (as in FIGS. 10 and 12).

Figure 7:
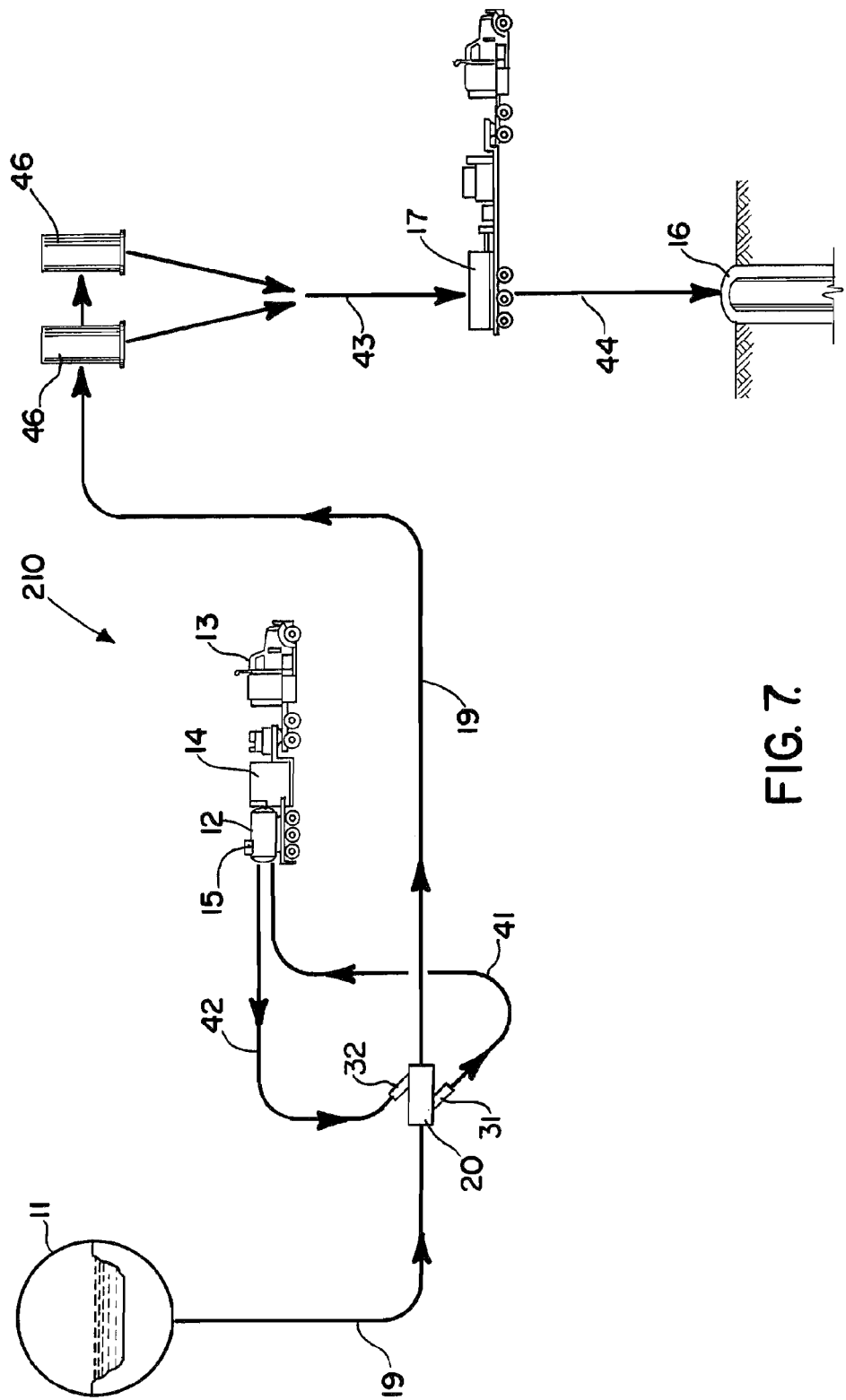
FIG. 7 is a schematic diagram of an alternative embodiment of the apparatus of the present invention.

In FIG. 7 (an alternate configuration), the surge tanks have been eliminated. The mixing tanks 46 can be used to mix any selected chemical and proppant or proppants with the water that has been discharged from mixer 20 and that is ready for use in hydraulic fracturing operation in the well 16.

Figure 5:
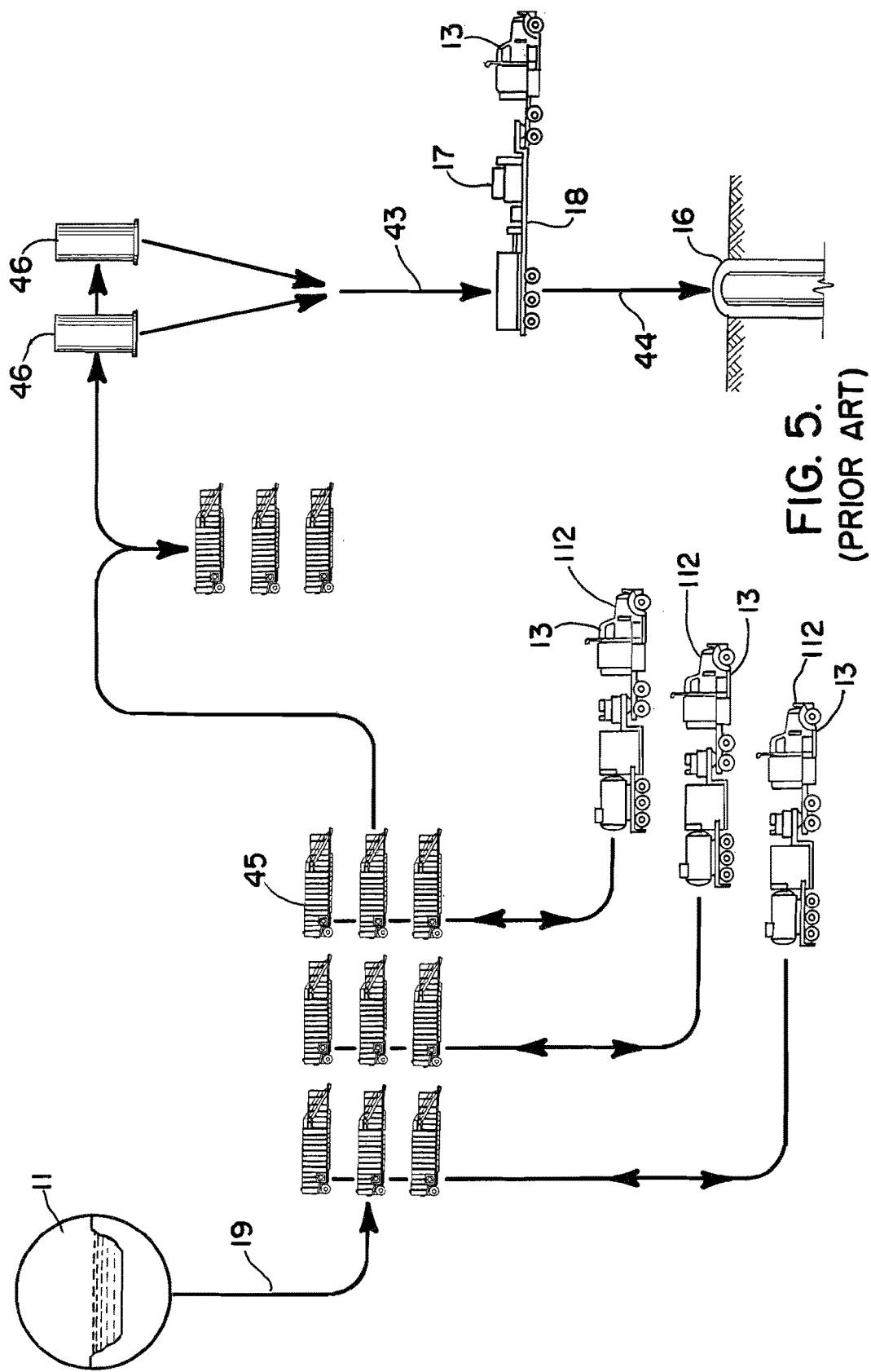
FIG. 5 is a schematic diagram of a prior art oil well frac pumping system.

Conventional heater trucks 112 shown in FIG. 5 typically produce much less than 20 million BTU (21.1 billion Joules). They could be used in the system and method of the present invention, but more robust heating units 12 (such as those produced by Chandler Manufacturing, Inc. in Wichita Falls, Tex.) capable of delivery of 22 million BTU (23.2 billion Joules) or more are preferred. Especially preferred are diesel powered heater units commercially available from Chandler Manufacturing, Inc. in which water flows through a series of metal coils, and there are six burners which heat the coils. An example of such a heater unit can be seen at www.chandlermfg.com/item.php?pid=34 and is identified as an oil-fired frac water heater (and shown in US Patent Publication no. US 2010/0000508). However, other heater units which can quickly heat large quantities of water can be used. The diesel powered units are preferred because in colder environments propane tends to liquify and not heat as effectively. Preferably one can run 70-100 barrels (8.3-11.9 kl) per minute per heating truck of the present invention while getting a temperature rise of at least about 15 degrees Fahrenheit (8.4° C.).

Through testing in cold temperatures, the inventor has learned that heating water from around freezing to about 40 degrees F. (4.4° C.) takes a great degree of heat. One might need more heaters 12 when heating water from near freezing, or one might initially preheat some water in additional frac tanks (e.g., 3 or 4 up to 50 or 100 frac tanks) to add heat one needs to move the temperature of the water up from near freezing to about 40 degrees F. (4.4° C.). One could also add heating in a water pit itself (e.g., when the water source 11 is a pond) to help raise the water temperature to around 40 or 45 degrees F. (4.4 or 7.2° C.) (there will be radiant heat loss from the water pit, so typically one would not want to heat the water in the pit much above 40 to 45 degrees F. (4.4 to 7.2° C.)) before further heating the water with the heating system of present invention shown in FIGS. 3 and 4, for example. The heating in the water pit could be done with, for example, a heater or heaters 12 as shown in FIGS. 3 and 4 that circulate water through hoses 41 and 42 to and from the water pit.

Also, while typically water freezes at 32 degrees F. (0° C.), flowing water or water with various substances can sometimes cool below 32 degrees F. (0° C.) without freezing. Thus, sometimes the present invention might start processing water which is below 32 degrees F. (0° C.). Also, sometimes the source water might have ice in it, but it can still be used if the water with ice can flow through mixer 20. However, it is preferred to avoid pulling ice into the intake, as considerable heat can be lost when melting the ice.

Surge or pivot tanks 45 are preferably upright circular tanks where the water flows in and out (similar to or the same as the mixing tanks 46 shown in FIG. 6). The agitation which occurs in the surge tanks 45 is helpful, and seem to add heat to the water (better mixing seems to occur as well, so even if surge or pivot tanks 45 are not needed for surge, one might want to use 2-20 of these anyway).

Figure 10:
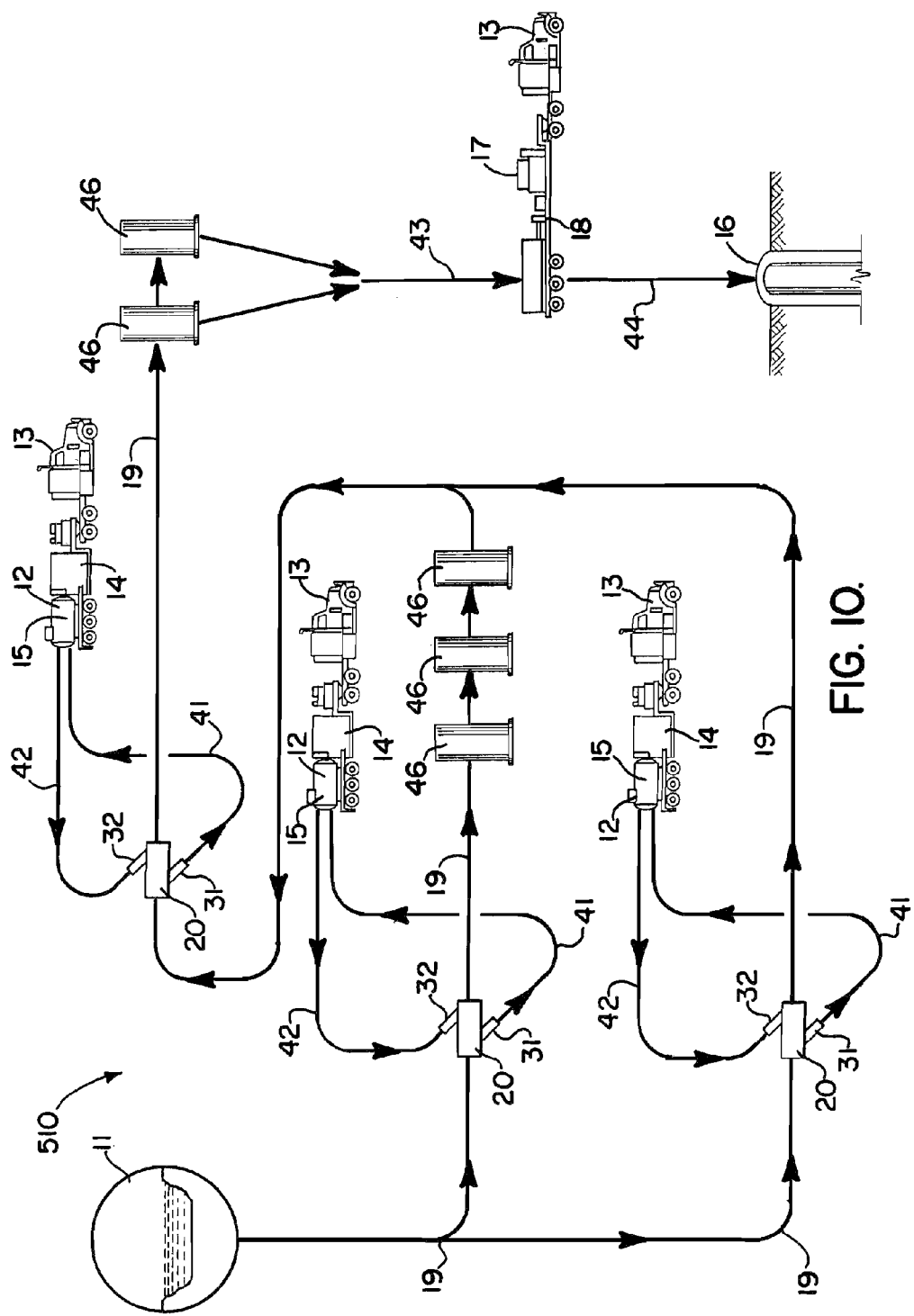
FIG. 10 is a schematic diagram of another alternative embodiment of the apparatus of the present invention.

Manifolding among multiple surge or pivot tanks can be done to balance heat. Pivot or surge tanks 45 could be shaped like mixing tanks 46. Preferably the heated water flows through the surge tanks (as shown in FIG. 10, where mixing tanks 46 are acting as surge tanks). The surge tanks provide a buffer in the event of some breakdown or other problem making it difficult to produce heater water. During the breakdown or other problem, heated water from the surge tanks can be routed to the mixing tanks, even though no heated water will be refilling the surge tanks. Preferably, either enough surge tanks are provided that no interruption in fracing occurs during a breakdown or other problem causing an interruption in heated water production, or enough surge tanks are provided that an orderly shutdown of fracing occurs during a breakdown or other problem causing an interruption in heated water production. Typically surge tanks hold around 480-500 barrels (57.2-59.6 kl) of heated water per tank.

Though pumps and valves are not shown in the drawings, appropriate pumps and valves are provided to direct water as desired, and one of ordinary skill in the art will be able to determine where to place such pumps and valves to achieve desired water flow.

Water lines can be manifolded together and several lines could feed and emanate from a single heating truck.

Flow rates can be 100 barrels (11.9 kl) per minute (though this could be higher or lower) and with the preferred heater trucks of the present invention, there will preferably be around a 15 degree F. (8.4° C.) increase in temperature at 100 barrels (11.9 kl) per minute (for one truck).

The current normal target water temperature is 70-90 degrees F. (21.1-32.2° C.) (but it could be higher). Overheating of the water is not needed (as one must do when heating tanks) as the heat loss (if any) using the on-line heating method of the present invention is typically minimal.

Maintenance of trucks used in the present invention includes chemical (e.g., hydrochloric acid) washing of the coils to keep heat transfer times low (otherwise there can be buildup on the coils which impedes heat transfer).

Probably a vertical, round tank (such as mixing tank 46) will work better for mixing hot and cold water to get a more uniform temperature of water to use in fracing.

Figure 8:
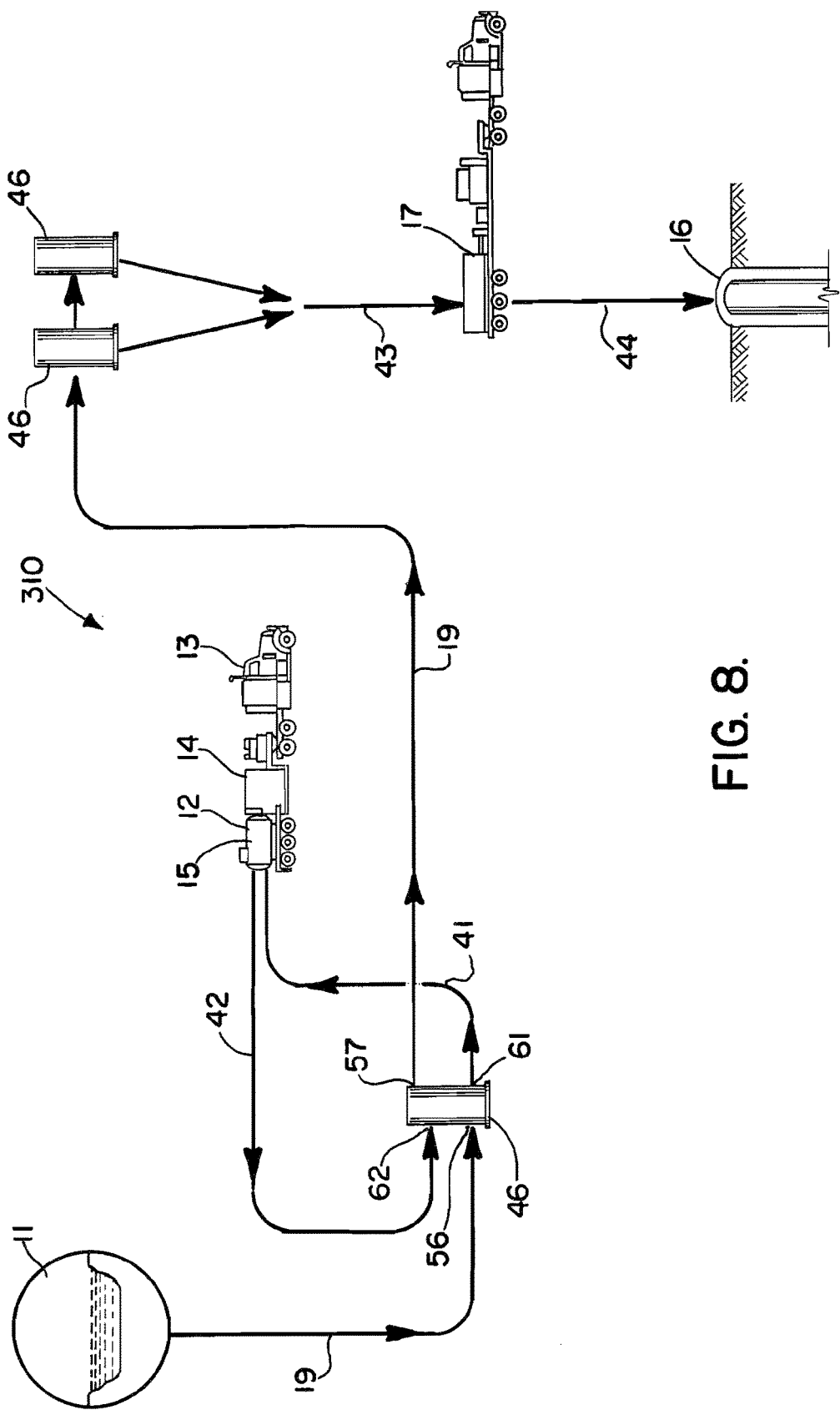
FIG. 8 is a schematic diagram of another alternative embodiment of the apparatus of the present invention.

FIG. 8 is similar to FIG. 7, but apparatus 310 shown therein includes a mixing tank 46 instead of the manifold 20 shown in FIG. 7 (anything that could cause turbulence could be used instead of the manifold 20 shown in FIG. 1, though the manifold 20 is preferred as it is a relatively simple and compact mixing device). Water drawn from water source 11 travels through flow line 19 and first inlet 56 into mixing tank 46, where some of the water is drawn off through second outlet 61 and line 41 into mobile heater 12, then back through flow line 42 and second inlet 62 into mixing tank 46, where it then continues to flow through first outlet 57 and flow line 19 to mixing tanks 46 which are near frac pumping apparatus 17. From there the water flows as in FIG. 7. It is believed that better mixing of water occurs in tank 46 when first inlet 56 is near the bottom of tank 46, first outlet 57 is near the top of tank 46, and second inlet 62 is somewhere in between. Also, it is believed that better mixing will occur if mixing tank 46 is a vertical cylindrical tank as shown in the drawings.

Figure 9:
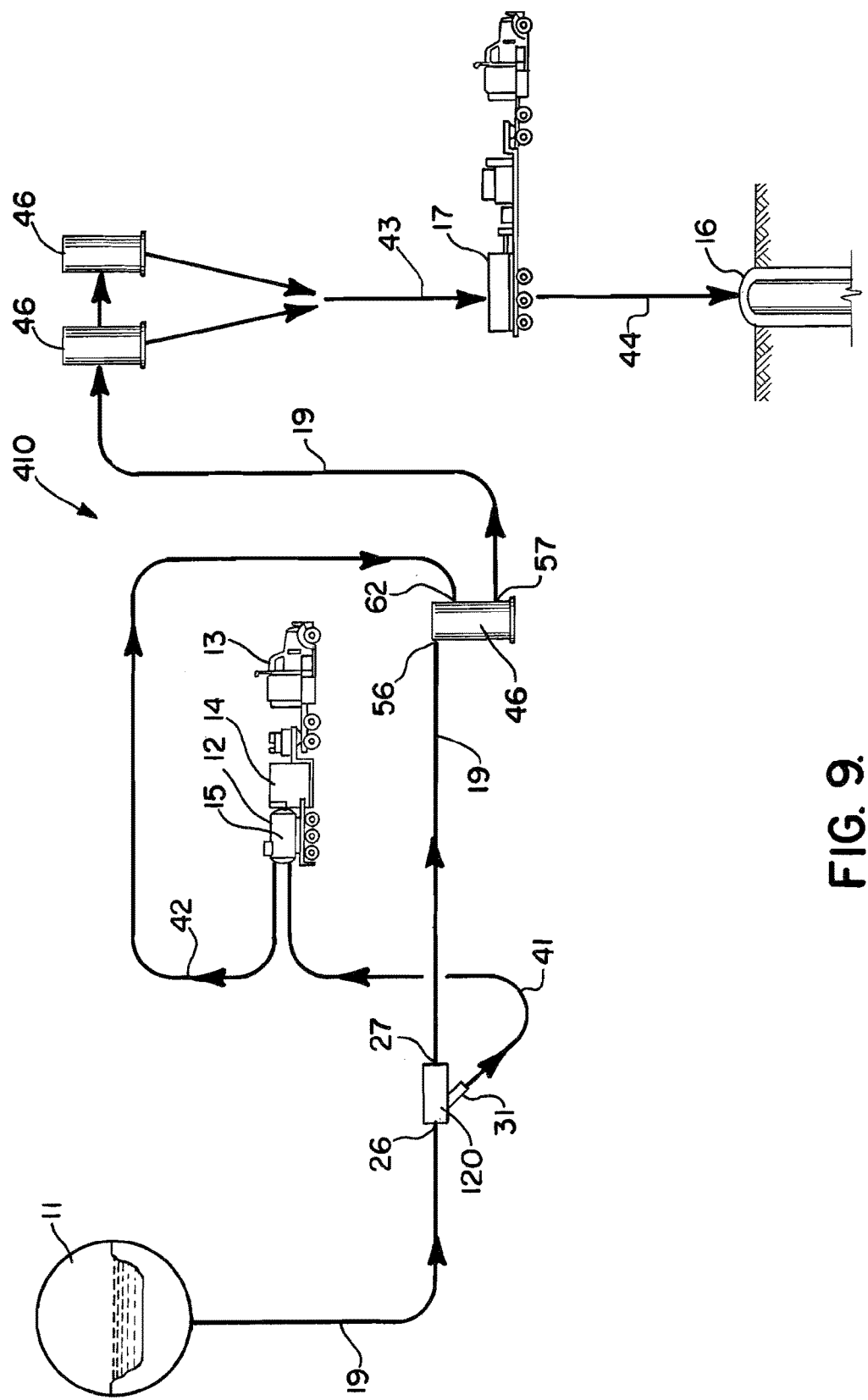
FIG. 9 is a schematic diagram of another alternative embodiment of the apparatus of the present invention.

FIG. 9 is similar to FIG. 8, but apparatus 410 shown therein includes a half manifold 120 and a mixing tank 46 instead of the manifold 20 shown in FIG. 1. As indicated in FIG. 9, water at the temperature of the water source 11 flows through half manifold 120, where some of the water is diverted out through second outlet (conduit) 31 of half manifold 120 into flow line 41 and to heater 12, then out through flow line 42 into second inlet 62 of mixing tank 46. The heated water from line 42 mixes in mixing tank 46 with the water which is at the temperature of water source 11 which enters tank 46 at first inlet 56. The water then flows out through first outlet 57 through flow line 19 to mixing tanks 46 which are near frac pumping apparatus 17. From there the water flows as in FIG. 7.

As can be seen for example in FIG. 9, the flow rate through the mixer is about equal to the flow rate of the water being pumped downhole. Also as seen for example in FIG. 9, the volume of the mix of cool or cold and heated water flowing out of the leftmost mixing tank 46 in FIG. 9 is greater than the volume of heated water flowing through line 42 from mobile heater apparatus 12.

FIG. 10 shows apparatus 510, which includes three mobile heaters 12 with three manifolds 20, two mobile heaters 12 in parallel with one another and located near the water source 11, and one mobile heater 12 closer to the frac pumping apparatus 17. There are three surge tanks 46 in series with one of the mobile heaters 12, though these surge tanks 46 could be in series with both mobile heaters 12 which are in parallel to one another, or they could be in series with all three mobile heaters 12 shown in FIG. 10. Further, there could be as few as none or one surge tank 46 to as many as considered prudent by the operator, which could be for example three or four up to 50 or 100 mixing tanks 46 (or even more). Flow of water through manifolds 20, heaters 12, and surge tanks 46 is as in prior figures.

Figure 11:
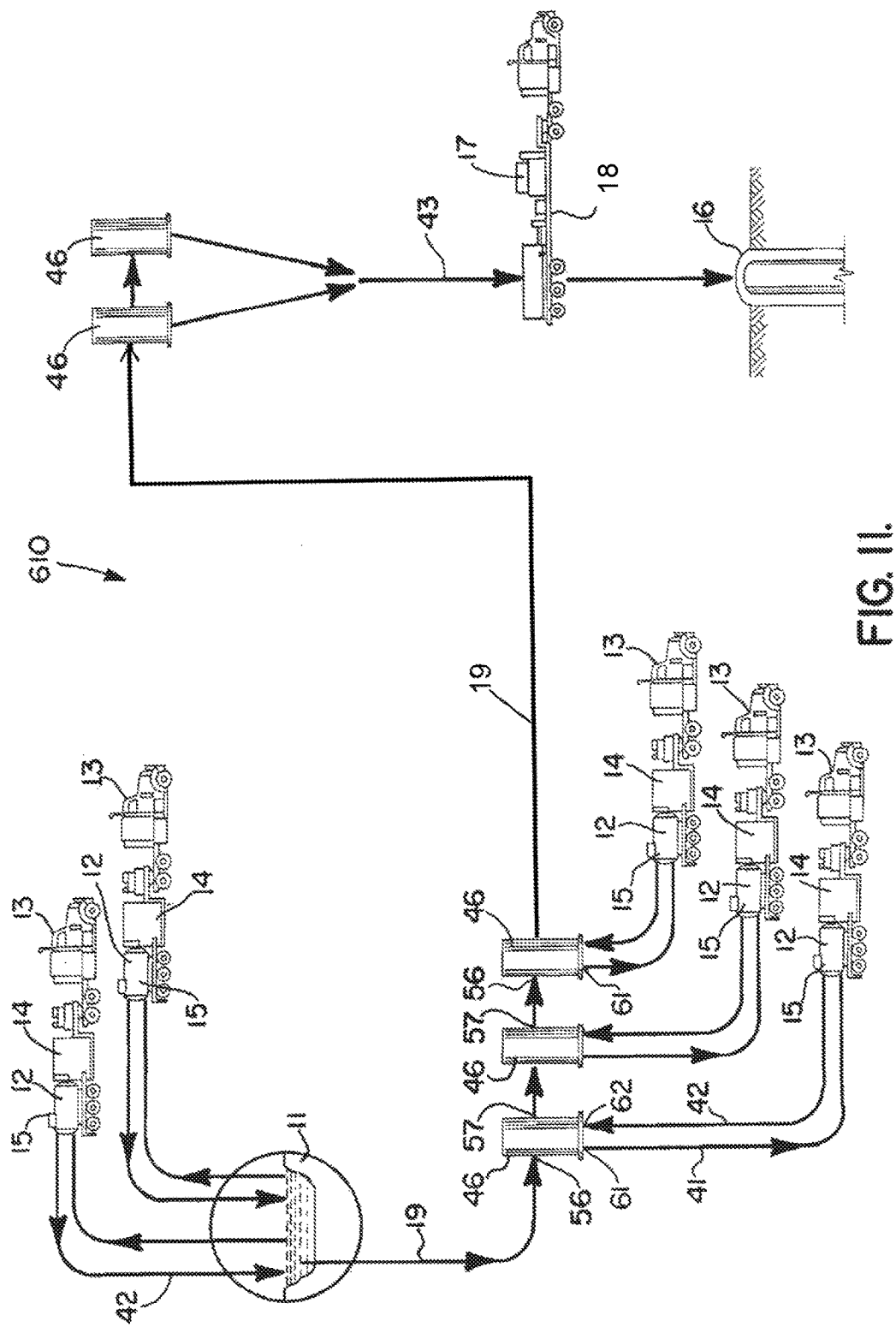
FIG. 11 is a schematic diagram of another alternative embodiment of the apparatus of the present invention.

FIG. 11 shows apparatus 610, which includes two mobile heaters 12 connected directly to the source water 11 (a pond) with the water being withdrawn from and returned to the pond. There are also three mobile heaters 12, each connected to a mixing tank 46, heating water in the mixing tanks 46. Further, there could be as few as none or one surge tank 46 and associated mobile heaters 12 to as many as considered prudent by the operator, which could be for example three or four up to 50 or 100 mixing tanks 46 with associated mobile heaters 12 (or even more).

Figure 12:
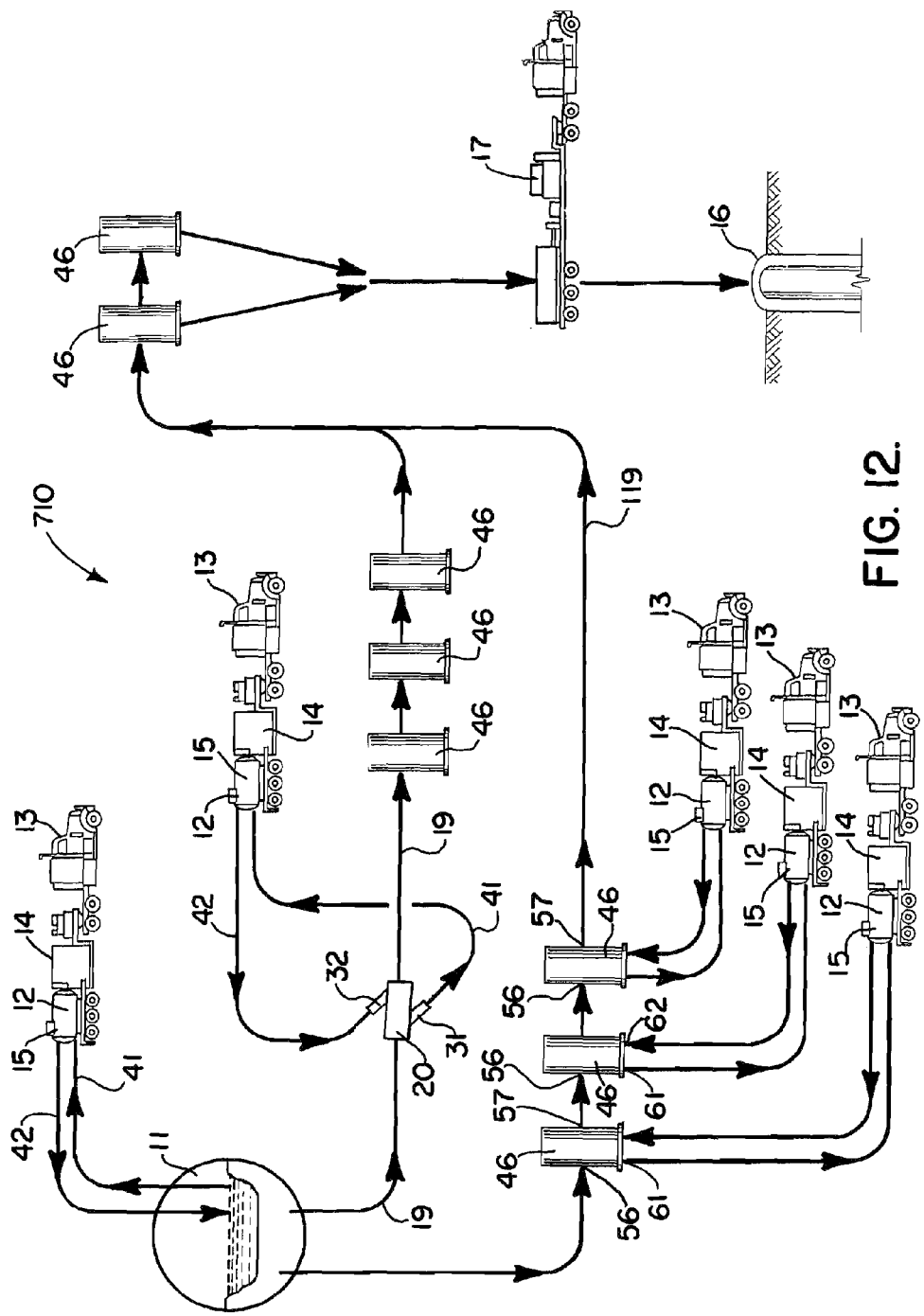
FIG. 12 is a schematic diagram of another alternative embodiment of the apparatus of the present invention.

FIG. 12 is similar to FIG. 11, but in FIG. 12 apparatus 710 differs from apparatus 610 in that one truck has moved from the pond 11 and is heating the water as it runs through the flow line 19. FIG. 12 shows three additional mixing tanks 46 in series with pipe 19 and acting as surge tanks. As in FIG. 11, there are also three mobile heaters 12, each connected to a mixing tank 46, heating water in the mixing tanks 46. These mixing tanks 46 are in series with one another in a flow line 119 which runs parallel to flow line 19 and then feeds into flow line 19. Further, there could be as few as none or one surge tank 46 and associated mobile heaters 12 to as many as considered prudent by the operator, which could be for example three or four up to 50 or 100 mixing tanks 46 with associated mobile heaters 12 (or even more).

There is a huge lake (Lake Sakakawea) in the middle of western North Dakota. Fracing operations were making a tremendous strain on groundwater. Now it is expected that water will be pulled from Lake Sakakawea with permits currently in process. It is believed that companies will soon pump water out of Lake Sakakawea and put it into insulated tanks, where it will be heated in the tanks. The water will then be taken via insulated trucks to a well site where fracing operations occur. The apparatus of the present invention can heat water as it is pumped from the lake into the tanks (and it can continue to heat the water once it is in the tanks). This method can occur in other areas as well.

The following is a list of parts and materials suitable for use in the present invention:

| PARTS LIST | |
|---|---|
| Parts Number | Description |
| 10 | hydraulic fracturing pumping system |
| 11 | water source |
| 12 | mobile heater apparatus |
| 13 | truck |
| 14 | trailer |
| 15 | vessel |
| 16 | oil and/or gas well |
| 17 | frac pumping apparatus |
| 18 | trailer |
| 19 | flow line |
| 20 | mixer |
| 21 | tubular/cylindrically-shaped body |
| 22 | wall |
| 23 | bore |
| 24 | inlet end portion |
| 25 | outlet end portion |
| 26 | inlet |
| 27 | outlet |
| 28 | arrow |
| 29 | arrow |
| 30 | curved arrow |
| 31 | conduit (second outlet) |
| 32 | conduit (second inlet) |
| 33 | bore |
| 34 | bore |
| 35 | inner end portion |
| 36 | outer end portion |
| 37 | inner end portion |
| 38 | outer end portion |
| 39 | arrow |
| 40 | arrow |
| 41 | flow line |
| 42 | flow line |
| 43 | flow line |
| 44 | flow line |
| 45 | surge tank |
| 46 | mixing tank or downhole tank or surge tank |
| 47 | joint of pipe |
| 56 | inlet (first) of mixing tank 46 |
| 57 | outlet (first) of mixing tank 46 |
| 61 | second outlet of mixing tank 46 |
| 62 | second inlet of mixing tank 46 |
| 110 | hydraulic fracturing pumping system |
| 112 | prior art mobile heating truck |
| 119 | flow line |
| 120 | half manifold |
| 210 | hydraulic fracturing pumping system |
| 310 | hydraulic fracturing pumping system |
| 410 | hydraulic fracturing pumping system |
| 510 | hydraulic fracturing pumping system |
| 610 | hydraulic fracturing pumping system |
| 710 | hydraulic fracturing pumping system |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A method of heating water for use in fracturing an oil and/or gas producing formation, comprising the steps of:
   a) providing a heating apparatus for heating water to a temperature of at least about 40 degrees F. (4.4 degrees C.);

b) receiving a water stream of cool or cold water at a mixer, the cool or cold water stream being at a temperature of less than a predetermined target temperature;

c) the mixer having a first inlet that receives cool or cold water from the stream of step "b" and a first outlet that enables discharge of a substantially continuous stream which is a mix of cool or cold and hot water;

d) the mixer having a second inlet that enables heated water to enter the mixer;

e) adding heated water from the transportable heating apparatus of step "a" to the mixer via the second inlet;

f) wherein the volume of water of step "b" is much greater than the volume of water of step "e";

g) wherein a selected proppant is added to the water discharged from the mixer after step "f"; and h) wherein the water and the proppant are transmitted into an oil and/or gas producing formation, wherein water flows substantially continuously from the first inlet to the first outlet during the fracturing process.

2. The method of claim 1 wherein the mixer has a tubular body with a bore.

3. The method of claim 2 wherein the tubular body bore has a central longitudinal axis and in step "e" the heated water enters the mixer bore at an angle.

4. The method of claim 2 wherein the tubular body bore has a central longitudinal axis and in step "f" the water discharges from the mixer bore at an angle.

5. The method of claim 2, wherein the mixer includes a lip that extends into the mixer bore to partially block flow and to create additional turbulence in the mixer bore.

6. The method of claim 2, wherein the second inlet of the mixer has a wall portion that extends into the mixer bore.

7. The method of claim 1 wherein the heated water and the cool or cold water mix in step "e" with turbulent flow.

8. The method of claim 1 wherein the transportable heating apparatus is a wheeled vehicle.

9. The method of claim 1 wherein the cool or cold water stream has a temperature of between about 33 and 80 degrees F. (0.6 and 27 degrees C.).

10. The method of claim 1 wherein the cool water stream has a temperature of above freezing.

11. The method of claim 1 wherein in step "e" the heated water stream has a temperature of between about 40 and 120 degrees F. (4.4 and 48.9 degrees C.).

12. The method of claim 1 wherein in step "e" the heated water stream has a temperature of between about 40 and 150 degrees F. (4.4 and 65.6 degrees C.).

13. The method of claim 1 wherein in step "e" the heated water stream has a temperature of between about 40 and 200 degrees F. (4.4 and 93.3 degrees C.).

14. The method of claim 1 wherein there are two mixers connected together in series in steps "b" through "e".

15. The method of claim 1 further comprising adding chemicals to the water during step "g".

16. The method of claim 1 wherein the mix of cool or cold and heated water flows at a rate of at least 20 barrels per minute into the formation.

17. The method of claim 16 wherein the mix of cool or cold and heated water flows at a rate of at least 30 barrels per minute into the formation.

18. The method of claim 1 wherein the volume of water flowing through the mixer during the fracing process is about the same as the volume of water being pumped downhole.

19. The method of claim 1, wherein the mixer is a mixing tank.

20. The method of claim 1, wherein the heating apparatus comprises at least two heating trucks.

21. An oil well hydraulic fracturing system, comprising:

a) a transportable heating apparatus that heats water to a temperature of at least 40 degrees F. (4.4 degrees C.);

b) a source of water at about ambient temperature;

c) a mixer having a first inlet and a first outlet;

d) a second inlet that enables heated water to enter the mixer;

e) a second outlet that enables removal of water from the mixer;

f) a first flowline that transmits water between the heater and the second inlet;

g) a second flowline that transmits water between the second outlet and the heater; and h) a mixing tank that is receptive of water flow from the mixer, said tank enabling a proppant to be mixed with water that is discharged from the first outlet.

22. The oil well hydraulic fracturing system of claim 21 wherein the mixer has a tubular body.

23. The oil well hydraulic fracturing system of claim 22 wherein the tubular body has a central longitudinal axis and heated water enters the mixer at an angle via the second inlet.

24. The oil well hydraulic fracturing system of claim 22 wherein the tubular body has a central longitudinal axis and water discharges from the mixer at an angle via the second outlet.

25. The oil well hydraulic fracturing system of claim 21 wherein the mixer is configured to mix heated water and ambient temperature water with turbulent flow downstream of second outlet.

26. The oil well hydraulic fracturing system of claim 21 wherein the heating apparatus is a wheeled vehicle.

27. The oil well hydraulic fracturing system of claim 21 wherein the source of water has a temperature of between about 33 and 80 degrees F. (0.6 and 27 degrees C.).

28. The oil well hydraulic fracturing system of claim 21 wherein the heated water in the first flowline has a temperature of between about 120 and 240 degrees F. (48.9 and 116 degrees C.).

29. The oil well hydraulic fracturing system of claim 21 wherein the mixer is connected in series with a second mixer so that the flow of water discharged from the first outlet is transmitted to the second mixer.

30. The oil well hydraulic fracturing system of claim 21 wherein the mixing tank also enables chemicals to be mixed with the water.

31. A method of heating water for use in fracturing a formation producing at least one of oil and gas, comprising the steps of:

a) providing a heating apparatus for heating water to a temperature of at least about 40 degrees F. (4.4 degrees C.);

b) receiving a water stream of cool or cold water at a mixer, the cool or cold water stream being at a temperature of less than a predetermined target temperature;

c) the mixer having a first inlet that receives cool or cold water from the stream of step "b" and a first outlet that enables discharge of a substantially continuous stream which is a mix of cool or cold and heated water;

d) the mixer having a second inlet that enables heated water to enter the mixer;

e) adding heated water from the heating apparatus of step "a" to the mixer via the second inlet;

f) wherein the volume of cool or cold water of step "b" is greater than the volume of heated water of step "e";

g) wherein a selected proppant is added to the mix of cool or cold and heated water discharged from the first outlet of the mixer and the mix of cool or cold and heated water and the proppant are transmitted into a formation producing at least one of oil and gas, wherein water flows substantially continuously from the first inlet to the first outlet during the fracturing process.

32. The method of claim 31 wherein the mix of cool or cold and heated water flows at a rate of at least 20 barrels per minute into the formation.

33. The method of claim 32 wherein the mix of cool or cold and heated water flows at a rate of at least 30 barrels per minute into the formation.

34. The method of claim 31 wherein the flow rate through the mixer during the fracing process is about equal to the flow rate of the water being pumped downhole.

35. The method of claim 31, wherein the mixer is a mixing tank.

36. The method of claim 31, wherein the heating apparatus comprises at least two heating trucks.

37. The method of claim 31, wherein the mixer has a bore, and the mixer includes a lip that extends into the mixer bore to partially block flow and to create additional turbulence in the mixer bore.

38. The method of claim 31, wherein the mixer has a bore, and the second inlet of the mixer has a wall portion that extends into the mixer bore.

39. The method of claim 31 wherein the volume of water flowing through the mixer during the fracing process is about the same as the volume of water being pumped downhole.

40. A method of heating water for use in fracturing a formation producing at least one of oil and gas, comprising the steps of:

a) providing a heating apparatus for heating water to a temperature of at least about 40 degrees F. (4.4 degrees C.);

b) receiving a water stream of cool or cold water at a mixer, the cool or cold water stream being at a temperature of less than a predetermined target temperature;

c) the mixer having a first inlet that receives cool or cold water from the stream of step "b" and a first outlet that enables discharge of a substantially continuous stream which is a mix of cool or cold and heated water;

d) the mixer having a second inlet that enables heated water to enter the mixer;

e) adding heated water from the heating apparatus of step "a" to the mixer via the second inlet;

f) wherein the volume of the mix of cool or cold and heated water is greater than the volume of heated water of step "e";

g) wherein a selected proppant is added to the mix of cool or cold and heated water discharged from the mixer after step "f"; and h) wherein the mix of cool or cold and heated water and the proppant are transmitted into a formation producing at least one of oil and gas, wherein water flows substantially continuously from the first inlet to the first outlet during the fracturing process.

41. The method of claim 40 wherein the mix of cool or cold and heated water flows at a rate of at least 20 barrels per minute into the formation.

42. The method of claim 41 wherein the mix of cool or cold and heated water flows at a rate of at least 30 barrels per minute into the formation.

43. The method of claim 40 wherein the volume of water flowing through the mixer during the fracing process is about the same as the volume of water being pumped downhole.

44. The method of claim 40 wherein the flow rate through the mixer during the fracing process is about equal to the flow rate of the water being pumped downhole.

45. The method of claim 40, wherein the mixer is a mixing tank.

46. The method of claim 40, wherein the heating apparatus comprises at least two heating trucks.

47. The method of claim 40, wherein the mixer has a bore, and the mixer includes a lip that extends into the mixer bore to partially block flow and to create additional turbulence in the mixer bore.

48. The method of claim 40, wherein the mixer has a bore, and the second inlet of the mixer has a wall portion that extends into the mixer bore.

\* \* \* \* \*